United States Patent Office 3,355,877
Patented Dec. 5, 1967

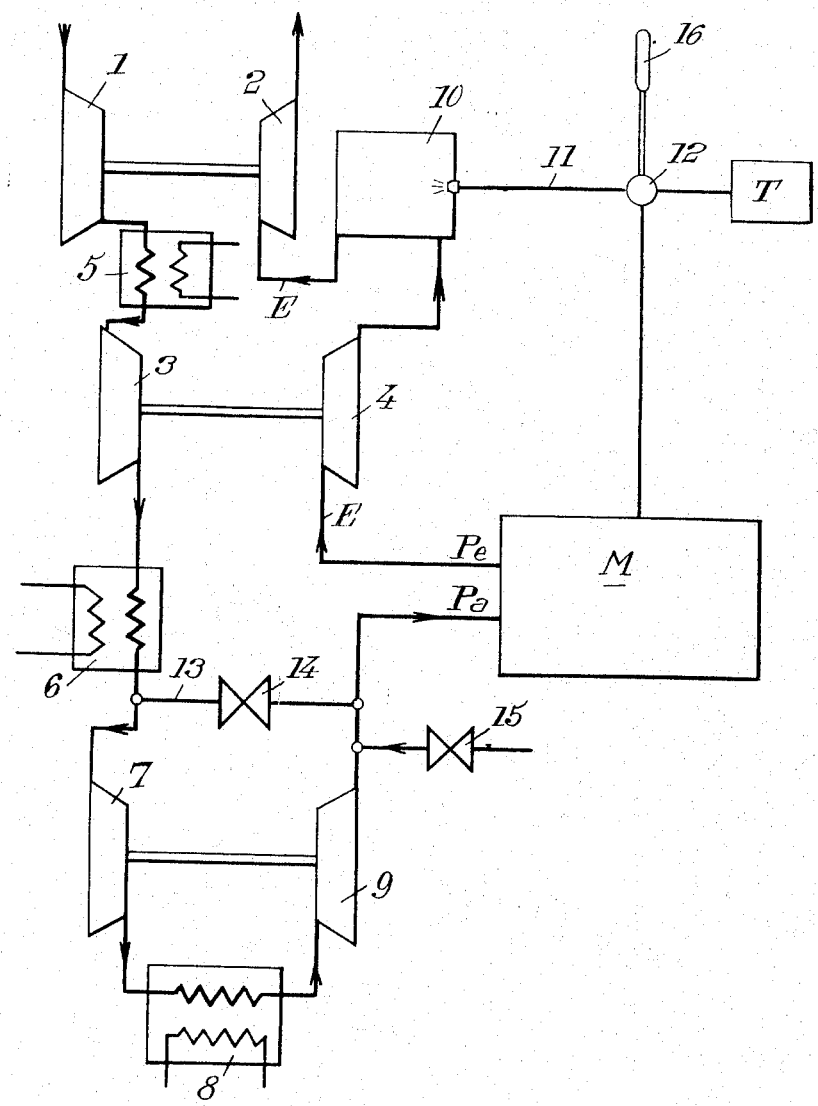

3,355,877
SUPERCHARGED DIESEL ENGINE POWER PLANTS
Pierre Philippe Chaffiotte, Cormeilles-en-Parisis, France, assignor to Societe d'Exploitation des Materiels Hispano-Suiza, Bois-Colombes, France
Filed May 24, 1965, Ser. No. 458,056
Claims priority, application France, June 9, 1964, 977,626
4 Claims. (Cl. 60—13)

ABSTRACT OF THE DISCLOSURE

A diesel internal combustion engine is provided, on the one hand, with a two-stage supercharging unit comprising a low pressure compressor and a high pressure compressor respectively driven by a low pressure turbine and a high pressure turbine, cooling units being placed one after the low pressure compressor and the other after the high pressure compressor, respectively, and, on the other hand, a turbo-cooling unit comprising a compressor fed from the second cooling unit, a cooler and a turbine the output of which is connected with the air intake of the internal combustion engine. This system is completed by providing, between the high pressure turbine and the low pressure turbine of the supercharger unit, a combustion chamber into which fuel is fed through a flow rate control member.

---

The present invention relates to supercharged diesel engines wherein the comburent, consisting generally of atmospheric air, is compressed in at least one compressor, called "superchanrging compressor," driven by at least one turbine, called "supercharging turbine," operated by the exhaust gases from said engine, the air thus compressed being sent into a turbo-cooling unit which chiefly comprises a compressor, called "supercompression compressor," a heat exchanger, and a turbine, called "cooling turbine," driving the supercompression compressor and wherein the air is partly expanded before being admitted into the diesel engine at a temperature which is lower than that which would be obtained by means of a conventionaly cooler interposed between the supercompression compressor and the diesel engine. The invention is more especially adapted to the case where the diesel engine serves to drive a heavy vehicle for instance a railroad vhicle.

It is known that the supercharging of a diesel engine involves, among other advantages, an increase of the specific mass of air admitted on every cycle of the engine. But as this compression goes together with a heating, it is necessary to cool down the air at the output of the supercharging compressor before it is admitted into the diesel engine, on the one hand to increase its specific mass, and, on the other hand, to improve the conditions of operation of some elements of said engine (pistons, valves, cylinders, cylinder heads, etc.).

For this purpose, it is already known to provide, at the output of the supercharging compressor, at least one heat exchanger wherein the hot fluid (compressed air coming from the supercharging compressor) yields heat to a cold fluid (fluid of the cooling circuit of the diesel engine or of an independent cooling circuit). Such an arrangement made it possible to limit, under temperate climate conditions, the temperature of the compressed air admitted to the diesel engine to about 70° C. By way of example, with a compression ratio of one to four, the heating due to compression produces an increase of temperature of about 190°–200° C.

In order further to reduce the input temperature of the compressed air, it has been also proposed to supercompress the air issuing from the supercharging compressor in a supercompression compressor at the output of which there is provided a heat exchanger capable of lowering the temperature of the supercompressed air to about 70° C. Then, this air is partly expanded in a cooling turbine which drives said supercompression compressor, which permits, on the one hand, of driving said last mentioned compressor without making use of external energy, and, on the other hand, of obtaining, for the air flowing out from said cooling turbine a temperature of about 10–15° C., the pressure of admission into the diesel engine remaining however at a value compatible with the supercharged character of said engine.

However, it has been found that, in diesel engine power plants of this type, the difference between the inlet pressure and the exhaust pressure had, especially in the case of an operation at high intake pressure (higher than two atmospheres), a value too low for ensuring a correct scavenging of said engines.

The chief object of the present invention is to provide a diesel engine power plant of this type which is better adapted to meet the requirements of practice, in particular concerning the scavenging of the engine.

For this purpose, according to the present invention, in a diesel engine power plant of the above mentioned type, there is further provided means for reheating the exhaust gases from the diesel engine serving to drive the supercharging turbine, as they are little, or only partly, expanded, whereby there is always maintained, between the intake pressure, and the exhaust pressure of said engine, a difference sufficient to ensure a correct scavenging of said engine.

Other features of the present invention will become apparent in the following detailed description of an embodiment of the invention hereinafter described with reference to the appended drawing which diagrammatically shows such a plant.

The diesel engine M is of any suitable type, including for instance several cylinders, and it is fed with fuel from a tank T.

The supercharging unit comprises:

(a) A low pressure stage, consisting of a low pressure compressor 1 driven by a low pressure turbine 2 operated by the exhaust gases escaping from diesel engine M through conduit E;

(b) A high pressure stage comprising a high pressure compressor 3 driven by a high pressure turbine 4 operated by the exhaust gases from diesel engine M fed through conduit E; and (c) A heat exchanger 5 provided between compressors 1 and 3 and a heat exchanger 6 provided at the outlet of high pressure compressor 3.

The turbo-cooling unit comprises:

(d) A supercompression compressor 7 receiving compressed air issuing from heat exchanger 6;

(e) A heat exchanger 8 connected with the output of supercompression compressor 7, and (f) A cooling turbine 9 mechanically coupled with compressor 7 for driving it and in which the air from exchanger 8 is partly expanded before being admitted at Pa into diesel engine M.

It should be pointed out that, with an arrangement as described up to now, the difference between the air intake pressure Pa and the exhaust pressure Pe of the gases flowing out from diesel engine M might, especially when the intake pressure Pa is higher than two atmospheres, have a value lower than that necessary for ensuring a correct scavenging of diesel engine M According to the embodiment of the present invention illustrated by the drawing, means are provided for reheating the exhaust gases from engine M when they are only partly expanded, that is to say between high pressure turbine 4 and low pressure turbine 2.

It will be understood that with such an arrangement a suitable adjustment of said reheating means permits, in all cases of operation of diesel engine M, of maintaining, between the intake pressure P$a$ and the exhaust pressure P$e$, a difference sufficient to ensure a correct scavenging of said engine M.

For this purpose, there is provided, between the high pressure turbine 4 and the low pressure turbine 2, a combustion chamber 10 into which fuel can be injected through a feed conduit 11 provided with a valve 12 the operation of which is controlled by a member 16 which also controls the feed of fuel to diesel engine M.

It is pointed out that combustion chamber 10 supplies turbine 2 with a continuous flow of power gases, which improves the operation of this turbine.

Advantageously, a shunt conduit 13 provided with a control valve 14 is interposed between the output of heat exchanger 6 and the air inlet conduit P$a$ of engine M.

On the other hand, when the plant is started and/or when the speed of engine M is suddenly increased, the inlet pressure P$a$ tends to decrease due to the inertia of the supercharging unit and of the turbo-cooling unit. In order to obviate this drawback there is provided between cooling turbine 9 and engine M a check valve 15 suitably loaded so as to permit the feed of engine M directly from the atmosphere when the feed pressure from turbine 9 to P$a$ becomes lower than atmospheric pressure.

This power plant works as follows:

When engine M works substantially at its nominal power, valve 14 and 15 being closed, a supplement of fuel is injected into combustion chamber 10.

If the power required from engine M decreases, the flow rate of fuel injected into chamber 10 is reduced, which causes the supercharging unit to slow down and reduces the feed pressure at P$a$.

By way of example, in the case of a diesel engine M the supercharging of which is ensured in the following conditions:

Intake pressure P$a$ equal to 3.86 kg./cm.$^2$, and

Intake temperature T$a$ equal to 10° C., and if it is desired to ensure a correct scavenging of said engine (value of the ratio of the intake pressure P$a$ to the exhaust pressure P$e$ always higher than 1) the amount of fuel injected through 11 into combustion chamber 10 corresponds to an increase of the fuel consumption averaging 23%.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. A power plant which comprises in combination, a supercharging unit including,
a compressor having its input open to the atmosphere, and
a turbine having its shaft coupled with the shaft of said compressor,
a turbo-cooling unit including,
a supercompression compressor having its input connected with the output of said compressor,
a cooling air turbine having its shaft coupled with the shaft of said supercompression compressor, and
a heat exchanger including an air circuit having its input connected with the output of said supercompression compressor and its output connected with the input of said cooling air turbine and a cooling fluid circuit mounted for heat interchange with said last mentioned air circuit,
a diesel engine having an air intake connected with the output of said cooling air turbine, the exhaust of said internal combustion engine being connected with the input of said first mentioned turbine,
adjustable fuel feed means for feeding fuel to said diesel engine,
a combustion chamber having an inlet and an outlet, said last mentioned inlet being connected with the exhaust of said diesel engine, said last mentioned outlet being connected with the input of said first mentioned turbine, the output of which opens to the atmosphere,
adjustable fuel feed means for feeding fuel to said chamber, and
means for placing said second mentioned fuel feed means under control of said first mentioned fuel feed means so that the flow rate of fuel feed varies in the same direction for both of said fuel feed means.

2. A power plant which comprises, in combination, a supercharging unit including,
a low pressure compressor having its input open to the atmosphere,
a low pressure turbine having its shaft coupled with the shaft of said low pressure compressor,
a high pressure compressor having its input connected with the output of said low pressure compressor, and
a high pressure turbine having its shaft coupled with the shaft of said high pressure compressor,
a turbo-cooling unit including,
a supercompression compressor having its input connected with the output of said high pressure compressor,
a cooling air turbine having its shaft coupled with the shaft of said supercompression compressor, and
a heat exchanger including an air circuit having its input connected with the output of said supercompression compressor and its output connected with the input of said cooling air turbine and a cooling fluid circuit mounted for heat interchange with said last mentioned air circuit,
a diesel engine having its intake connected with the output of said cooling air turbine, the exhaust of said internal combustion engine being connected with the input of said high pressure turbine,
a combustion chamber having an inlet and an outlet, said last mentioned inlet being connected with the output of said high pressure turbine, said last mentioned outlet being connected with the input of said low pressure turbine, the output of said low pressure turbine opening to the atmosphere, and
adjustable means for feeding fuel to said chamber.

3. A power plant which comprises, in combination, a supercharging unit including,
a low pressure compressor having its input open to the atmosphere,
a low pressure turbine having its shaft coupled with the shaft of said low pressure compressor,
a first heat exchanger including an air circuit having its input connected to the output of said low pressure compressor and a cooling fluid circuit mounted for heat interchange with said air circuit,
a high pressure compressor having its input connected with the output of said air circuit,
a high pressure turbine having its shaft coupled with the shaft of said high pressure turbine, and
a second heat exchanger including an air circuit having its input connected to the output of said high pressure compressor and a cooling fluid circuit mounted for heat interchange with said last mentioned air circuit,
a turbo-cooling unit including,
a supercompression compressor having its input connected with the output of the air circuit of said second heat exchanger,
a cooling air turbine having its shaft coupled with the shaft of said supercompression compressor, and
a third heat exchanger including an air circuit having its input connected with the output of said supercompression compressor and its output connected with the input of said cooling air turbine and a cooling fluid circuit mounted for heat interchange with said last mentioned air circuit,
a diesel engine having its intake connected with the output of said cooling air turbine, the exhaust of said internal combustion engine benig connected with the input of said high pressure turbine,
adjustable fuel feed means for feeding fuel to said diesel engine,
a combustion chamber having an inlet and an outlet, said last mentioned inlet being connected with the output of said high pressure turbine, said last mentioned outlet being connected with the input of said low pressure turbine, the output of said low pressure turbine opening to the atmosphere,
adjustable fuel feed means for feeding fuel to said chamber, and
means for placing said second mentioned fuel feed means under control of said first mentioned fuel feed means so that the flow rate of fuel feed varies in the same direction for both of said fuel feed means.

4. A power plant according to claim 2 further comprising:
a first heat exchanger including on the one hand an air circuit inserted between the output of said low pressure compressor and the input of the high pressure compressor and on the other hand a cooling fluid circuit mounted for heat interchange with said air circuit, and
a second heat exchanger including on the one hand an air circuit inserted between the output of said high pressure compressor and the input of said supercompression compressor and on the other hand a cooling fluid circuit mounted for heat interchange with said last mentioned air circuit.

References Cited
UNITED STATES PATENTS

| | | | |
|---|---|---|---|
| 2,580,591 | 1/1952 | Pouit | 60—13 X |
| 2,703,561 | 3/1955 | Froehlich | 123—119 |
| 3,141,293 | 7/1964 | Crooks | 123—119 |

RALPH D. BLAKESLEE, *Primary Examiner.*

MARK M. NEWMAN, *Examiner.*